(12) United States Patent
Schoelerman

(10) Patent No.: US 11,936,216 B2
(45) Date of Patent: Mar. 19, 2024

(54) TELEMATICS DEVICE AND METHOD FOR REPORTING EQUIPMENT DATA

(71) Applicant: Terex South Dakota, Inc., Watertown, SD (US)

(72) Inventor: Ryan Schoelerman, Frewsburg, NY (US)

(73) Assignee: TEREX SOUTH DAKOTA, INC., Watertown, SD (US)

(*) Notice: Subject to any disclaimer, the term of this patent is extended or adjusted under 35 U.S.C. 154(b) by 194 days.

(21) Appl. No.: 17/651,160

(22) Filed: Feb. 15, 2022

(65) Prior Publication Data

US 2023/0261478 A1     Aug. 17, 2023

(51) Int. Cl.
*H02J 7/00* (2006.01)
*G08C 17/02* (2006.01)
*H04L 67/12* (2022.01)
*H04W 52/02* (2009.01)

(52) U.S. Cl.
CPC .......... *H02J 7/00034* (2020.01); *G08C 17/02* (2013.01); *H02J 7/00036* (2020.01); *H04L 67/12* (2013.01); *H04W 52/0261* (2013.01); *H04W 52/0277* (2013.01)

(58) Field of Classification Search
CPC .. H02J 7/00034; H02J 7/00036; G08C 17/02; H04L 67/12; H04W 52/0261; H04W 52/0277
See application file for complete search history.

(56) References Cited

U.S. PATENT DOCUMENTS

| 10,430,784 | B1 | 10/2019 | He et al. | |
|---|---|---|---|---|
| 2015/0334518 | A1 | 11/2015 | Hall et al. | |
| 2021/0252921 | A1 | 8/2021 | Lesesky et al. | |
| 2022/0303906 | A1* | 9/2022 | Khan | H04W 52/0277 |
| 2022/0361109 | A1* | 11/2022 | Hegde | H04W 52/0251 |
| 2023/0042164 | A1* | 2/2023 | Xhafa | H02J 7/0048 |
| 2023/0234550 | A1* | 7/2023 | Eifert | B60W 10/26 |
| | | | | 701/36 |

OTHER PUBLICATIONS

International Search Report and Written Opinion for Application No. PCT/US22/45275, dated Jan. 11, 2023, 5 Pages.

\* cited by examiner

*Primary Examiner* — Orlando Bousono
(74) *Attorney, Agent, or Firm* — Brooks Kushman P.C.

(57) ABSTRACT

A telematics device for reporting data includes a controller, a device battery, and a transceiver to transmit telematics signals including data associated with equipment having a battery. During an inactive state of the equipment, (i) when the equipment battery voltage exceeds a first threshold, the transceiver transmits signals at a first interval powered by the equipment battery, (ii) when the equipment battery voltage fails to exceed the first threshold but exceeds a second threshold and the device battery voltage exceeds a device battery threshold, the transceiver transmits signals at a second interval powered by the device battery, and (iii) when the equipment battery voltage fails to exceed the first threshold but exceeds the second threshold and the device battery voltage fails to exceed the device battery threshold, the transceiver transmits signals at a third interval powered by the equipment battery, and the device battery recharges from the equipment battery.

20 Claims, 2 Drawing Sheets

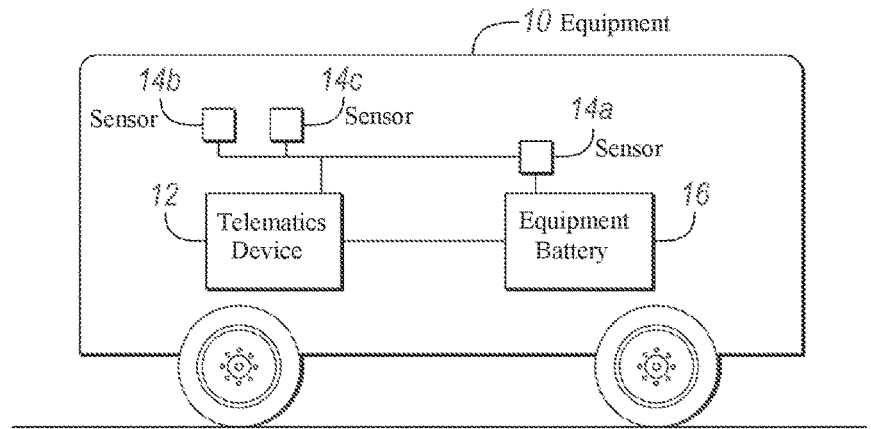
FIG. 1
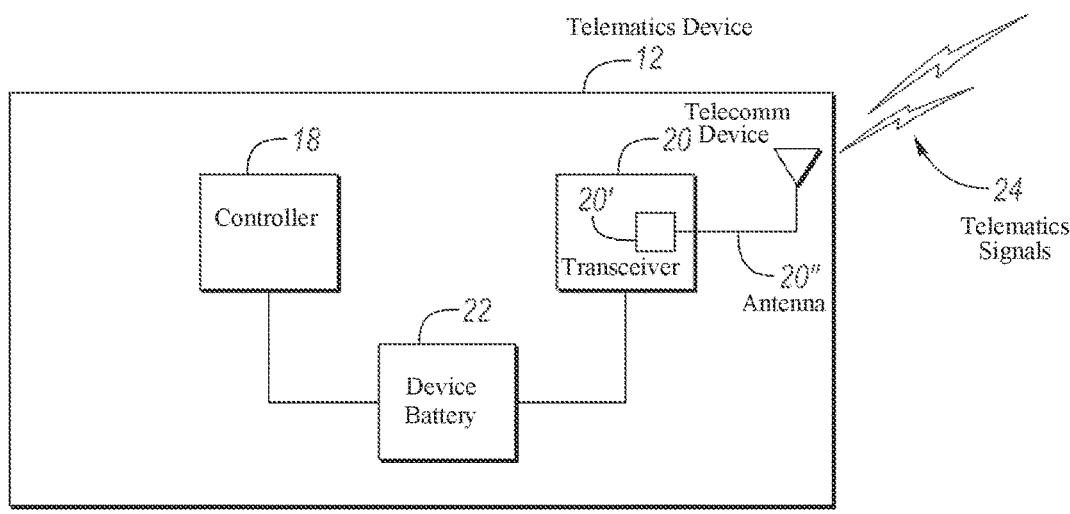
FIG. 2
| | PERIODIC MESSAGE RATE | | | | | | | | | |
|---|---|---|---|---|---|---|---|---|---|---|
| | 1 hrs | 2 hrs | 4 hrs | 8 hrs | 12 hrs | 18 hrs | 20 hrs | 24 hrs | 48 hrs | 72 hrs |
| UNIT | ESTIMATED BATTERY LIFESPAN | | | | | | | | | |
| TD | 1.8d | 2.2d | 2.5d | 2.7d | 2.8d | 2.8d | 2.8d | 2.9d | 2.9d | 2.9d |
FIG. 3

TELEMATICS DEVICE AND METHOD FOR REPORTING EQUIPMENT DATA

TECHNICAL FIELD

The following relates to a telematics device and method for reporting data associated with equipment.

BACKGROUND

Telematics technology utilizes sensors, controllers, and telecommunication devices/systems to sense, report, and monitor information associated with various types of equipment, including vehicles, scissor lifts, boom lifts, forklifts, and other types of machines. More particularly, sensors associated with the equipment, such as battery monitors, fuel sensors, global positioning systems (GPS), and other sensors, may be used to sense different equipment parameters, including battery or fuel levels, location, hours of operation, faults, or other parameters. Such information may be provided to a telematics device, which typically includes an electronic control unit (ECU) or controller and a wireless telecommunication device. The controller may monitor different equipment parameters indicated by the equipment sensors and, via the telecommunication device, report such parameters over a telecommunication system to remote devices or locations. Equipment information monitored and reported in such a fashion by telematics devices may be valuable for many purposes, including equipment troubleshooting in the field, preventative maintenance, and location tracking. An exemplary telematics system is the Genie Lift Connect Program provided by Terex Corporation.

The components of a telematics device, including the controller and telecommunication device, may be powered by a battery associated with the equipment on which the telematics device is mounted or into which the telematics device is integrated. As well, a telematics device may include a device battery which may also be capable of powering the controller and telecommunication device thereof. In that regard, when the equipment is running and/or in-use, which may be referred to as an active state or active operating mode of the equipment, the telematics device may be powered by the equipment battery. Alternatively, when the equipment is parked and its controls powered-off, which may be referred to as an inactive state or inactive operating mode of the equipment, the telematics device may be powered by the equipment battery or the telematics device battery.

During an active equipment state, when powered by the equipment battery, a telematics device may transmit wireless telematics signals at an interval of every 15 minutes, although more or less frequent intervals may alternatively be employed. However, during an inactive equipment state, whether powered by the equipment battery or the device battery, transmitting wireless telematics signals at such an interval quickly depletes battery capacity. As a result, telematics health may be negatively affected during an inactive equipment state due to a reduced duration available for telematics reporting of data associated with the equipment.

A need therefore exists for an improved telematics device and method for reporting data associated with equipment which defines a balanced approach for maintaining equipment battery health and telematics health and that allows for a duration of data reporting that supports the business need of prioritizing equipment maintenance. Such an improved telematics device and method would improve the duration of telematics data reporting maintained after the equipment battery voltage drops to a critical level, and would thereby help address, reduce, mitigate, solve, or eliminate the issues or problems described above associated with existing telematics devices.

SUMMARY

According to one non-limiting exemplary embodiment described herein, a telematics device is provided for reporting data associated with equipment. The telematics device comprises a transceiver configured to transmit wireless telematics signals comprising data associated with the equipment, wherein the equipment includes an equipment battery having first and second equipment battery threshold values associated therewith, the first equipment battery threshold value being greater than the second equipment battery threshold value. The telematics device further comprises a device battery having a device battery threshold value associated therewith, and a controller. During an inactive state of the equipment, the controller is configured to (i) when a voltage level of the equipment battery is greater than the first equipment battery threshold value, control the transceiver to transmit equipment telematics signals at a first interval, wherein the transceiver is powered by the equipment battery, (ii) when the voltage level of the equipment battery is less than or equal to the first equipment battery threshold value but greater than the second equipment battery threshold value and a voltage level of the device battery is greater than the device battery threshold value, control the transceiver to transmit equipment telematics signals at a second interval less frequent than the first interval, wherein the transceiver is powered by the device battery, and (iii) when the voltage level of the equipment battery is less than or equal to the first equipment battery threshold value but greater than the second equipment battery threshold value and the voltage level of the device battery is less than or equal to the device battery threshold value, control the transceiver to transmit equipment telematics signals at a third interval less frequent than the first interval, wherein the transceiver is powered by the equipment battery, and recharge the device battery from the equipment battery.

According to another non-limiting exemplary embodiment described herein, a method is provided for reporting data associated with equipment in an inactive state via a telematics device comprising (i) a transceiver configured to transmit wireless telematics signals comprising data associated with the equipment, wherein the equipment includes an equipment battery having first and second equipment battery threshold values associated therewith, the first equipment battery threshold value being greater than the second equipment battery threshold value, (ii) a device battery having a device battery threshold value associated therewith, and (iii) a controller. The method comprises, when a voltage level of the equipment battery is greater than a first equipment battery threshold value, transmitting equipment telematics signals at a first interval wherein the transceiver is powered by the equipment battery. The method further comprises, when the voltage level of the equipment battery is less than or equal to the first equipment battery threshold value but greater than the second equipment battery threshold value and a voltage level of the device battery is greater than the device battery threshold value, transmitting equipment telematics signals at a second interval less frequent than the first interval wherein the transceiver is powered by the device battery. The method further comprises, when the voltage level of the equipment battery is less than or equal to the first equipment battery threshold value but greater than the second equipment battery threshold value and the voltage level of the device battery is less than or equal to the device battery threshold value, transmitting equipment telematics signals at a third interval less frequent than the first interval wherein the transceiver is powered by the equipment battery and recharging the device battery from the equipment battery.

According to another non-limiting exemplary embodiment described herein, a non-transitory computer readable storage medium is provided having stored computer executable instructions for reporting data associated with equipment in an inactive state via a telematics device comprising (i) a transceiver configured to transmit wireless telematics signals comprising data associated with the equipment, wherein the equipment includes an equipment battery having first and second equipment battery threshold values associated therewith, the first equipment battery threshold value being greater than the second equipment battery threshold value, (ii) a device battery having a device battery threshold value associated therewith, and (iii) a controller. The instructions when executed by the controller cause the telematics device to, when a voltage level of the equipment battery is greater than a first equipment battery threshold value, transmit equipment telematics signals at a first interval wherein the transceiver is powered by the equipment battery. The instructions when executed by the controller further cause the telematics device to, when the voltage level of the equipment battery is less than or equal to the first equipment battery threshold value but greater than the second equipment battery threshold value and a voltage level of the device battery is greater than the device battery threshold value, transmit equipment telematics signals at a second interval less frequent than the first interval wherein the transceiver is powered by the device battery. The instructions when executed by the controller further cause the telematics device to, when the voltage level of the equipment battery is less than or equal to the first equipment battery threshold value but greater than the second equipment battery threshold value and the voltage level of the device battery is less than or equal to the device battery threshold value, transmit equipment telematics signals at a third interval less frequent than the first interval wherein the transceiver is powered by the equipment battery, and recharge the device battery from the equipment battery.

A detailed description of these and other non-limiting exemplary embodiments of a telematics device and method for reporting data associated with equipment is set forth below together with the accompanying drawings.

BRIEF DESCRIPTION OF THE DRAWINGS

FIG. 1 is a simplified block diagram of a non-limiting exemplary embodiment of equipment having a telematics device for reporting data associated with the equipment;

FIG. 2 is a simplified block diagram of a non-limiting exemplary embodiment of a telematics device for reporting data associated with equipment according to one non-limiting exemplary embodiment of the present disclosure; and FIG. 3 is a table illustrating an estimated lifespan for a non-limiting exemplary device battery depending upon non-limiting exemplary periodic message reporting rates provided by a non-limiting exemplary telematics device.

DETAILED DESCRIPTION

Figure 4:
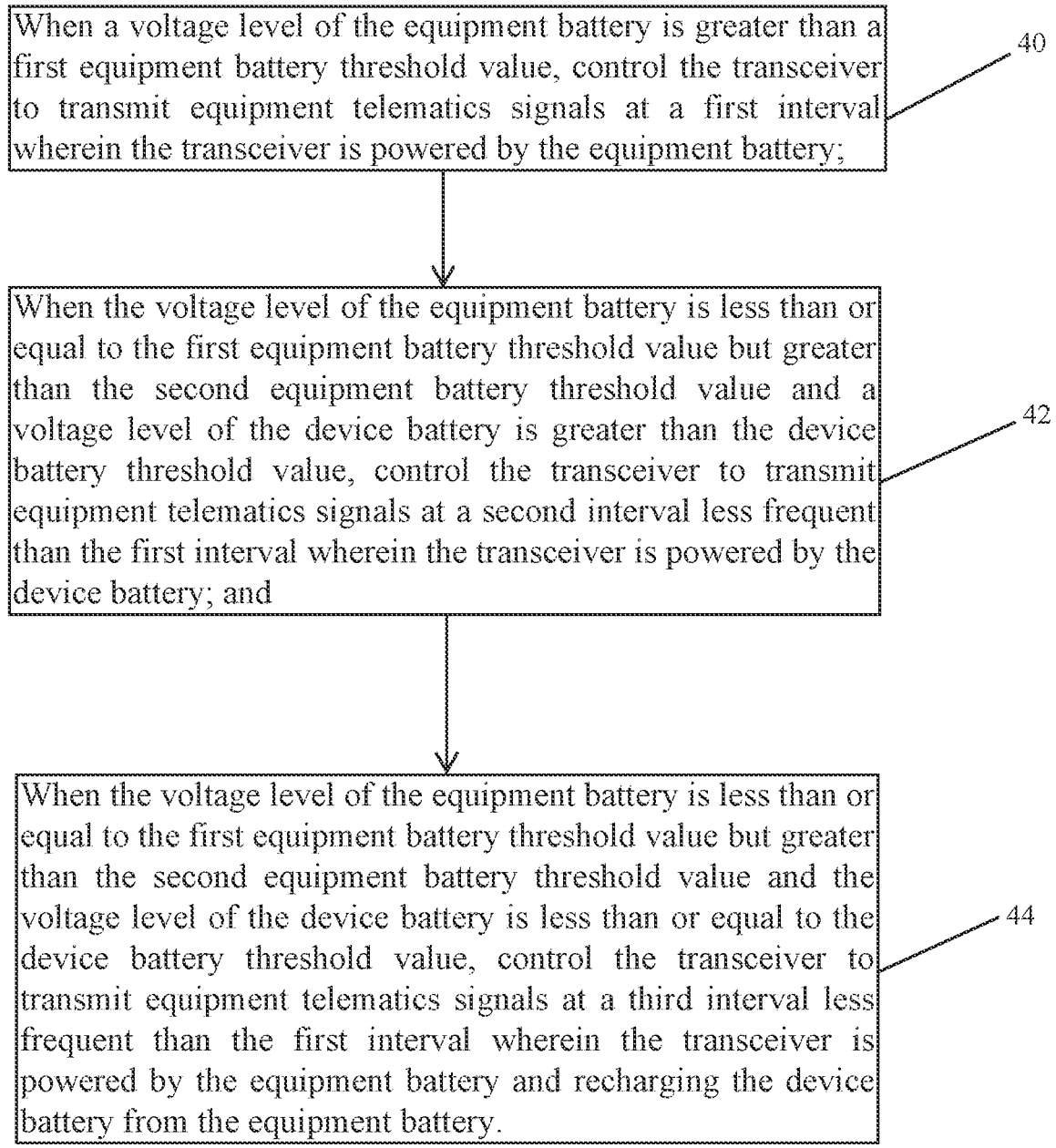
FIG. 4 is a flowchart illustrating non-limiting exemplary functionality of a non-limiting exemplary embodiment of a telematics device for reporting data associated with equipment according to one non-limiting exemplary embodiment of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to the Figures, a more detailed description of non-limiting exemplary embodiments of a telematics device and method for reporting data associated with equipment will be provided. For ease of illustration and to facilitate understanding, like reference numerals may be used herein for like components and features throughout the drawings.

In that regard, FIG. 1 is a simplified block diagram of a non-limiting exemplary embodiment of equipment 10 having a telematics device 12 for reporting data associated with the equipment 10. FIG. 2 is a simplified block diagram of a non-limiting exemplary embodiment of a telematics device 12 for reporting data associated with equipment 10 according to one non-limiting exemplary embodiment of the present disclosure.

As previously described, telematics device 12 utilizes sensors 14a, 14b, 14c to sense, report, and monitor information associated with equipment 10 having a battery 16. In that regard, the equipment 10 may comprise a vehicle, scissor lift, boom lift, forklift, or any other type of equipment, machine, or device. The equipment 10 may be driven and/or powered by an internal combustion engine (ICE) (not shown), which may be started using the equipment battery 16. In such an embodiment, the equipment 10 may also include an alternator (not shown) for recharging the equipment battery 16, which in such an embodiment may comprise a 12-volt battery or any other suitable battery having any other appropriate voltage. The alternator and/or equipment battery 16 may provide power to electrical or electronic components or systems (not shown) in or on the equipment 10, such as electric motors, lights, electronic displays, electronic controls and/or control systems, or any other electrical or electronic components or systems.

Alternatively, the equipment 10 may be driven and/or powered by a battery or batteries, which may include the equipment battery 16 (e.g., the equipment 10 may comprise an electric vehicle (EV)). Such a battery or batteries, including the equipment battery 16, may provide power to electrical or electronic components or systems (not shown) in or on the equipment 10, such as electric motors, lights, electronic displays, electronic controls and/or control systems, or any other electrical or electronic components or systems. In such an embodiment, the equipment 10 may include an on-board interface and/or be configured to cooperate with external charging equipment, stations, or systems to periodically recharge equipment batteries, which may include battery 16, which in such an embodiment may comprise a 24-volt battery or any other suitable battery having any other appropriate voltage.

The sensors 14a, 14b, 14c associated with the equipment 10 may provide data and/or information to telematics device 12, which may comprise an electronic control unit (ECU) or controller 18, a wireless telecommunication device 20 including a transceiver 20' and an antenna and a device battery 22. In that regard, sensors 14*a*, 14*b*, 14*c* may include a battery monitor sensor 14*a*, global positioning system (GPS) 14*b*, fuel sensor 14*c*, or any other type of sensor to sense different parameters associated with the equipment 10, including equipment battery level or fuel level, location, hours of operation, faults, or other equipment parameters. The controller 18 of the telematics device 12 may monitor different parameters of the equipment 10 indicated by the equipment sensors 14*a*, 14*b*, 14*c* and, via the telecommunication device 20, transmit wireless equipment telematics signals 24 over a telecommunication system (not shown) to report such parameters to remote devices or locations (not shown). It is noted that the telecommunication device may be a cellular device, WiFi device, or any other type of device capable of wireless communication. It is further noted that the transceiver 20' may also receive wireless signals for use by the controller 18 for various purposes, such as, e.g., programming or adjusting settings of the telematics device 12, or on-demand reporting by the telematics device 12 of particular equipment parameters, such as location, in response to a received wireless command signal. As also previously described, information associated with the equipment 10 monitored and reported in such a fashion by the telematics device 12 may be valuable for many purposes, including troubleshooting the equipment 10 in the field, preventative maintenance of the equipment 10, and tracking the location of the equipment 10.

The components of a telematics device 12, including the controller 18 and the telecommunication device 20, may be powered by the battery 16 associated with the equipment 10 on which the telematics device 12 is mounted or into which the telematics device 12 is integrated. As well, the device battery 22 of the telematics device 12 may also be capable of powering the telematics device 12, including the controller 18 and the telecommunication device 12 thereof. In that regard, when the equipment 10 is running and/or in-use, which may be referred to as an active state or active operating mode of the equipment 10, the telematics device 12 may be powered by the equipment battery 16. Alternatively, when the equipment 10 is parked and its controls powered-off, which may be referred to as an inactive state or inactive operating mode of the equipment 10, the telematics device 12 may be powered by the equipment battery 16 or the telematics device battery 22.

During an active state of the equipment 10, when the equipment 10 may be powered by the equipment battery 16, the telematics device 12 may transmit wireless telematics signals at an interval of every 15 minutes, although other more or less frequent intervals may be employed. However, during an inactive state of the equipment 10, whether the equipment 10 is powered by the equipment battery 16 or the device battery 22, transmitting wireless telematics signals 24 at such an interval quickly depletes battery capacity. As a result, telematics health may be negatively affected due to a reduced duration available for telematics reporting.

A need therefore exists for an improved telematics device 12 and method for reporting data associated with equipment 10 which defines a balanced approach for maintaining equipment battery health and telematics health and that allows for a duration of data reporting that supports the business need of prioritizing equipment maintenance. Such an improved telematics device 12 and method would improve the duration of telematics data reporting maintained after the equipment battery voltage drops to a critical level and would thereby help address, reduce, mitigate, solve, or eliminate the issues or problems described herein associated with existing telematics devices.

In that regard, during an inactive equipment state, the telematics device 12 could be configured to transmit wireless telematics signals at longer or greater intervals than the active equipment state interval, such as every hour, to extend the lifespan of either the equipment battery 16 or the device battery 22 and thus the duration of telematics reporting. In that same regard, during such an inactive equipment state, the telematics device 12 could initially draw power from the equipment battery 16 and switch to internal battery power when the voltage level of the equipment battery 16 reaches a selected threshold value. The threshold value selected could be designed to preserve overall health of the equipment battery 16 by maintaining its capacity above a critical level. However, due to the extended reporting interval and the limited lifespan of a telematics device battery 22, such a switch may result in telematics health being interpreted as poor because insufficient information is available to determine equipment battery health.

Telematics health could alternatively be improved by lowering the selected threshold voltage value of the equipment battery 16 at which the telematics device 12 switches to drawing power from its internal device battery 22. In that regard, such a reduced threshold voltage may be selected based solely on the minimum voltage requirement to keep the telematics device 12 powered. However, such an approach means that the telematics device 12 could draw on the equipment battery 16 to the point that equipment battery health may be threatened if not monitored properly.

While an intermediate threshold value between the threshold values described above could alternatively be selected, any such intermediate threshold value could result in a lack of commonality for mixed fleet solutions, where one type of telematics device performs differently than another type of telematics device and needs to be monitored according to different rules. Moreover, whether the duration of reporting available using such an intermediate threshold would be satisfactory for telematics health purposes would require testing individual telematics devices and batteries for any threshold value or values under consideration.

It is noted that equipment battery health may be reported via telematics signals in the form of or including battery voltage information or data. The battery voltage should not reach a low level that will compromise the battery health and longevity. Telematics health may be characterized as the ability for the telematics device 12 to maintain a duration of equipment battery voltage reporting that allows for prioritization of equipment 10 to receive maintenance. In this disclosure, telematics reporting duration may be defined by how long the telematics device 12 draws power from the equipment battery 16 until a voltage threshold is met and then the telematics device 12 switches to its internal battery 22 and reports data until the internal battery 22 has reached its minimum limit. In that regard, such an equipment voltage threshold may be defined in the firmware of the telematics device 12 at which the telematics device 12 switches to its internal battery 22 to maintain reporting.

FIG. 3 is a table illustrating an estimated lifespan for a non-limiting exemplary device battery 22 depending upon non-limiting exemplary periodic message reporting rates provided by a non-limiting exemplary telematics device 12. As seen therein, and with continuing reference to FIG. 2, an exemplary telematics device (TD) 12 may have an internal device battery 22 that has different estimated lifespans depending upon the rate or interval at which telematics messages are periodically reported by transmission of wireless telematics signals 24. More specifically, the exemplary internal battery 22 of the exemplary TD 12 has an estimated battery lifespan of 1.8 days when transmitting wireless telematics signals 24 at an interval of every hour. That estimated lifespan increases to 2.2 days, 2.5 days, and 2.7 days when the TD 12 transmits wireless telematics signals 24 at intervals of every two hours, four hours, and eight hours, respectively. At transmission intervals of 12 hours, 18 hours, and 20 hours, the estimated lifespan of the internal battery 22 increases to 2.8 days. Finally, at transmission intervals of 24 hours, 48 hours, and 72 hours, the estimated lifespan of the internal battery 22 increases to 2.9 days.

With continuing reference to FIGS. 1-3, an exemplary telematics device 12 mounted on or integrated into equipment 10 having a 12-volt battery 16 may be configured such that an exemplary voltage threshold of 11.1 volts for the equipment battery 16 is selected or established at which the telematics device 12 cuts, switches, or transfers over to the internal battery 22. So configured, at the 1-hour message reporting interval illustrated in FIG. 3, the telematics device 12 stops reporting in under 2 days (i.e., 1.8 days). Such a result may be interpreted as poor telematics health because not enough information is available to determine machine battery health.

An alternative equipment voltage threshold for such a cut over of the telematics device 12 from the equipment battery 16 to the internal battery 22 may be selected or established, for example lowered to a value of 7 volts, which keeps the exemplary telematics device 12 drawing for a longer duration on the equipment battery 16 for data reporting. This approach and the selected voltage threshold may be based solely on the minimum voltage requirement to keep an exemplary telematics device 12 powered. So configured, this means that an exemplary telematics device 12 can draw power from the equipment battery 16 to the point that such a power draw threatens the health of the equipment battery 16 if not monitored properly.

An intermediate equipment battery voltage threshold between the exemplary equipment battery voltage thresholds described above (e.g., between 11.1 volts and 7 volts) for such a cut over of the telematics device 12 from the equipment battery 16 to the internal battery 22 may be selected or established, for example 10 volts. So configured, this means that an exemplary telematics device 12 may perform differently than other telematics devices and require monitoring according to different rules, which can create a lack of commonality for a mixed fleet solution. Whether the resulting duration of reporting available using such an intermediate threshold would be satisfactory for telematics health purposes would require testing individual telematics devices and batteries for this or any other intermediate threshold value or values.

The improved telematics device 12 of the present disclosure may be configured to maintain a balance of telematics reporting health and equipment battery health and extend data reporting duration to meet the reporting and/or other requirements. In that regard, in an inactive state, i.e., the condition when the equipment 10 is powered down and the telematics device 12 has gone into sleep mode and wakes on a defined interval for data reporting, the telematics device 12 may be configured such that firmware of the telematics device 12 is set to an equipment battery threshold of 11.1 volts at which the telematics device 12 ceases drawing power from the equipment battery 16 and switches to drawing power from the internal battery 22 instead. The telematics device 12 may be configured to transmit an alert notification when this equipment battery threshold is reached.

The telematics device 12 may also be configured such that while the equipment battery voltage is greater than 11.1 volts, the telematics device 12 draws power from the equipment battery 16 and reports the equipment battery voltage on a wake from sleep interval of every hour, although another interval may alternatively be employed. It is noted that, in addition to equipment battery voltage, the telematics device may also report any other additional information or parameters associated with the equipment 10, such as location. That is, the wireless telematics signal 24 transmitted at such an interval by the transceiver 20' of the telematics device 12 as controlled by the controller 18 of the telematics device 12, may comprise equipment battery voltage information or data as well as ay other additional information or data associate with the equipment 10. It is also noted that configuring or configuration of the telematics device as describe herein includes configuring or configuration of the controller 18 of the telematics device 12 to perform and/or control the transceiver 20' to perform the operations and/or functions as also described herein.

The telematics device 12 may also be configured such that when the telematics device switches to drawing power from the internal battery 22, the wake from sleep reporting interval is every 12 hours, although another interval may alternatively be employed. In that regard, such a reporting interval may vary by device battery capacity, such that the interval may potentially be more frequent if the capacity of the device battery 22 allows. In such a fashion (i.e., a wake from sleep reporting interval of every 12 hours), telematics health of the equipment 10 may be extended to 2.8 days, as seen in FIG. 3.

Moreover, the telematics device 12 may be further configured such that, when the voltage level of the internal battery 22 of the telematics device 12 reaches a threshold value where the internal battery 22 requires charging or reaches a threshold value that will trigger the telematics device 12 to go into hibernation or a hibernate mode, the telematics device 12 switches back over to the equipment battery 16 for power and draws power from the equipment battery 16 for reporting while and/or until the internal battery 22 recharges and/or is fully charged. In that regard, the telematics device 12 may be configured to refrain from powering the transceiver 20' by the device battery 22 until the device battery 22 has been fully recharged or alternatively may resume powering the transceiver 20' from the device battery 22 when the voltage level of the device battery 22 reaches a suitable value. An alert of this event (i.e., the voltage level of the internal battery 22 of the telematics device 12 reaches a threshold value where the internal battery 22 requires charging or reaches a threshold value that will trigger the telematics device 12 to go into hibernation or a hibernate mode) may also be reported by the telematics device 12 via transmission of a telematics signal 24. Still further, the wake from sleep reporting interval may be maintained at every 12 hours, although another interval may alternatively be employed. In such a fashion, as seen in FIG. 3, telematics health of the equipment 10 may be further extended by another 2.8 days.

Such operations may be repeated by the telematics device 12 until the voltage level of the equipment battery 16 drops to 10 volts, at which point the telematics device 12 may enter a hibernate mode. An alert of this event may also be reported by the telematics device 12 via transmission of a telematics signal 24. It is noted that the telematics device 12 may subsequently exit such a hibernate mode when the equipment 10 enters an active state.

In such a fashion, the telematics device and method of the present disclosure may at a minimum extend the wake from sleep reporting of the telematics device to just under 6 days (e.g., 2.8+2.8=5.6 days) (see FIG. 3). However, the data reporting could theoretically be extended beyond 6 days, depending on how long it takes for the equipment battery 16 to drop to 10 volts, which may be determined by testing.

It is noted that the telematics method of the present disclosure may also be applied to other telematics devices after evaluating on a case-by-case basis the internal battery life of such telematics devices and the reporting methodology, to adjust the methodology to suit the device characteristics. It is further noted that, while equipment battery thresholds of 11.1 volts and 10 volts have been described herein in association with a 12-volt equipment battery 16, such as for internal combustion engine driven equipment 10, other voltage thresholds may alternatively be selected or utilized, either in connection with a 12-volt equipment battery 16 or with an equipment battery having any other nominal voltage. In that regard, as previously described, a 24-volt equipment battery 16 may be provided, such as for DC battery powered equipment 10, in which case equipment battery thresholds of 22.2 volts and 20 volts may be selected or utilized according to the present disclosure as described herein.

Still referring to FIGS. 1-3, the present disclosure provides a telematics device 12 for reporting data associated with equipment 10. The telematics device 12 may comprise a transceiver 20' configured to transmit wireless telematics signals 24, which may comprise information or data associated with the equipment 10. In that regard, the equipment 10 may include a battery 16 having first and second equipment battery threshold values associated therewith, the first equipment battery threshold value being greater than the second equipment battery threshold value. It is noted that the transceiver 20' may also be configured for receiving wireless signals, such as wireless signals for use by the controller 18 for various purposes, such as, e.g., programming or adjusting settings of the telematics device 12, or on-demand reporting by the telematics device 12 of particular equipment parameters, such as location, in response to a received wireless command signal.

The telematics device 12 may further comprise a device battery 22 having a device battery threshold value associated therewith, and a controller 18 which may be provided in electrical communication with the transceiver 20' and the battery 22. In that regard, the device battery 22 may also be provided in electrical communication with the transceiver 20'.

FIG. 4 is a flowchart illustrating non-limiting exemplary functionality of a non-limiting exemplary embodiment of a telematics device for reporting data associated with equipment according to one non-limiting exemplary embodiment of the present disclosure. Referring now to FIGS. 1-4, during an inactive state of the equipment 10, described previously, the controller 18 may be configured to, when 40 a voltage level of the equipment battery 16 is greater than the first equipment battery threshold value, control the transceiver 20' to transmit equipment telematics signals 24 at a first interval, wherein the transceiver 20' is powered by the equipment battery 16. In that regard, it should be noted that transmission of telematics signals 24 at the first interval may alternatively also depend on the voltage level of the device battery 22 exceeding a threshold. During an inactive state of the equipment 10, the controller 18 may also be configured to, when 42 the voltage level of the equipment battery 16 is less than or equal to the first equipment battery threshold value but greater than the second equipment battery threshold value and a voltage level of the device battery 22 is greater than the device battery threshold value, control the transceiver 20' to transmit equipment telematics signals 24 at a second interval less frequent than the first interval, wherein the transceiver 20' is powered by the device battery 22. During an inactive state of the equipment 10, the controller 18 may also be configured to, when 44 the voltage level of the equipment battery 16 is less than or equal to the first equipment battery threshold value but greater than the second equipment battery threshold value and the voltage level of the device battery 22 is less than or equal to the device battery threshold value, control the transceiver 20' to transmit equipment telematics signals 24 at a third interval less frequent than the first interval, wherein the transceiver 20' is powered by the equipment battery 16, and recharge the device battery 22 from the equipment battery 16.

In that regard, the first interval may be once every hour and the second interval may be once every 12 hours, although any other first and second intervals may be selected or utilized where the second interval is less frequent than the first interval. As well, the third interval may be equal to the second interval or may alternatively be another interval less frequent than the first interval.

The controller 18 of the telematics device 12 may be further configured to, when the voltage level of the equipment battery 16 is less than or equal to the second equipment battery threshold value and the voltage level of the device battery 22 is less than or equal to the device battery threshold value, enter a hibernation mode. Still further, the controller 18 may be configured to, when the voltage level of the equipment battery 16 is less than or equal to the second equipment battery threshold value and the voltage level of the device battery 22 is greater than the device battery threshold value, control the transceiver 20' to transmit equipment telematics signals at the second interval (or an alternative interval) wherein the transceiver 20' is powered by the device battery 22.

Moreover, for equipment 10 comprising an internal combustion engine powered machine, the first equipment battery voltage threshold value may be 11.1 volts and the second equipment battery voltage threshold value may be 10 volts. For equipment 10 comprising a battery powered machine, the first equipment battery voltage threshold value may be 22.2 volts and the second equipment battery voltage threshold value may be 20 volts.

Furthermore, the controller 18 may also be configured to control the transceiver 20' to transmit a wireless alert signal when the voltage level of the equipment battery 16 is less than or equal to the first equipment battery threshold value, and/or when the device battery 22 recharges from the equipment battery, and/or when the controller 18 enters hibernation mode.

The controller 18 may be further configured to compare the voltage level of the equipment battery 16 to the first equipment battery threshold value and, when the voltage level of the equipment battery 16 is less than or equal to the first equipment battery threshold value, compare the voltage level of the equipment battery 16 to the second equipment battery threshold value. The controller 18 may also be configured to, when the voltage level of the equipment battery 16 is less than or equal to the first equipment battery threshold value but greater than the second equipment battery threshold value, compare the voltage level of the device battery 22 to the device battery threshold value. The controller 18 may be still further configured to, when the voltage level of the equipment battery 16 is less than or equal to the second equipment battery threshold value, compare voltage level of the device battery 22 to the device battery threshold value. In that regard, the controller 18 may receive signals from the equipment battery 16, the device battery 22, or sensors associated with the equipment battery 16 or device battery 22, indicating or representative of the voltage level of the equipment battery 16 or device battery 22.

It is noted that the telematics device 12, controller 18, telecommunications device 20, including transceiver 20' and antenna 20", and device battery 22, and/or any other unit, control unit, controller, console, algorithm, device, feature, system, functionality, module, arrangement, or the like described herein may comprise and/or be implemented in or by one or more appropriately programmed processors (e.g., one or more microprocessors including central processing units (CPU)) and associated memory and/or storage, which may include data, firmware, operating system software, application software and/or any other suitable computer executable program, code or instructions executable by the processor(s) for controlling operation thereof and/or for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry) or individually packaged or assembled into a SoC (System-on-a-Chip). As well, several processors and various circuitry and/or hardware may be distributed among several separate components and/or locations.

In that regard, the components described herein, including the telematics device 12, controller 18, telecommunications device 20, including transceiver 20' and antenna 20", and device battery 22, may enable, facilitate, or be configured as described herein to provide a method for reporting data associated with equipment in an inactive state via a telematics device, performing the various steps, functions and/or operations described herein. As well, the memory and/or storage and executable programs, code, or instructions described herein, may enable, facilitate, or be configured as described herein to provide a non-transitory computer readable storage medium having stored computer executable instructions for reporting data associated with equipment in an inactive state via a telematics device, to perform the particular algorithms represented by the various steps, functions and/or operations described herein As is readily apparent from the foregoing, various non-limiting embodiments of a telematics device and method for reporting data associated with equipment have been described. The telematics device and method of the present disclosure define a balanced approach for maintaining equipment battery health and telematics health and that allows for a duration of data reporting that supports the business need of prioritizing equipment maintenance. The telematics device and method of the present disclosure improve the duration of telematics data reporting maintained after the equipment battery voltage drops to a critical level, and thereby help address, reduce, mitigate, solve, or eliminate the issues or problems described above associated with existing telematics devices.

While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A telematics device for reporting data associated with equipment, the telematics device comprising: a transceiver configured to transmit wireless telematics signals comprising data associated with the equipment, wherein the equipment includes an equipment battery having first and second equipment battery threshold values associated therewith, the first equipment battery threshold value being greater than the second equipment battery threshold value; a device battery having a device battery threshold value associated therewith; and a controller wherein, during an inactive state of the equipment, the controller is configured to when a voltage level of the equipment battery is greater than the first equipment battery threshold value, control the transceiver to transmit equipment telematics signals at a first interval, wherein the transceiver is powered by the equipment battery; when the voltage level of the equipment battery is less than or equal to the first equipment battery threshold value but greater than the second equipment battery threshold value and a voltage level of the device battery is greater than the device battery threshold value, control the transceiver to transmit equipment telematics signals at a second interval less frequent than the first interval, wherein the transceiver is powered by the device battery; and when the voltage level of the equipment battery is less than or equal to the first equipment battery threshold value but greater than the second equipment battery threshold value and the voltage level of the device battery is less than or equal to the device battery threshold value, control the transceiver to transmit equipment telematics signals at a third interval less frequent than the first interval, wherein the transceiver is powered by the equipment battery, and recharge the device battery from the equipment battery.

2. The telematics device of claim 1 wherein the third interval is equal to the second interval.

3. The telematics device of claim 1 wherein the controller is further configured to, when the voltage level of the equipment battery is less than or equal to the second equipment battery threshold value and the voltage level of the device battery is less than or equal to the device battery threshold value, enter a hibernation mode.

4. The telematics device of claim 1 wherein the controller is further configured to, when the voltage level of the equipment battery is less than or equal to the second equipment battery threshold value and the voltage level of the device battery is greater than the device battery threshold value, control the transceiver to transmit equipment telematics signals at the second interval powered by the device battery.

5. The telematics device of claim 1 wherein, for equipment comprising an internal combustion engine powered machine, the first equipment battery voltage threshold value is 11.1 volts and the second equipment battery voltage threshold value is 10 volts, and wherein, for equipment comprising a battery powered machine, the first equipment battery voltage threshold value is 22.2 volts and the second equipment battery voltage threshold value is 20 volts.

6. The telematics device of claim 1 wherein the first interval is once every hour and the second interval is once every 12 hours.

7. The telematics device of claim 1 wherein the controller is further configured to control the transceiver to transmit a wireless alert signal (i) when the voltage level of the equipment battery is less than or equal to the first equipment battery threshold value, (ii) when the device battery recharges from the equipment battery, and (iii) when the controller enters a hibernation mode.

8. A method for reporting data associated with equipment in an inactive state via a telematics device comprising (i) a transceiver configured to transmit wireless telematics signals comprising data associated with the equipment, wherein the equipment includes an equipment battery having first and second equipment battery threshold values associated therewith, the first equipment battery threshold value being greater than the second equipment battery threshold value, (ii) a device battery having a device battery threshold value associated therewith, and (iii) a controller, the method comprising:

when a voltage level of the equipment battery is greater than a first equipment battery threshold value, transmitting equipment telematics signals at a first interval wherein the transceiver is powered by the equipment battery;

when the voltage level of the equipment battery is less than or equal to the first equipment battery threshold value but greater than the second equipment battery threshold value and a voltage level of the device battery is greater than the device battery threshold value, transmitting equipment telematics signals at a second interval less frequent than the first interval wherein the transceiver is powered by the device battery;

when the voltage level of the equipment battery is less than or equal to the first equipment battery threshold value but greater than the second equipment battery threshold value and the voltage level of the device battery is less than or equal to the device battery threshold value, transmitting equipment telematics signals at a third interval less frequent than the first interval wherein the transceiver is powered by the equipment battery and recharging the device battery from the equipment battery.

9. The method of claim 8 wherein the third interval is equal to the second interval.

10. The method of claim 8 further comprising, when the voltage level of the equipment battery is less than or equal to the second equipment battery threshold value and the voltage level of the device battery is greater than the device battery threshold value, transmitting equipment telematics signals at the second interval wherein the transceiver is powered by the device battery.

11. The method of claim 8 wherein, for equipment comprising an internal combustion engine powered machine, the first equipment battery voltage threshold value is 11.1 volts and the second equipment battery voltage threshold value is 10 volts, and wherein, for equipment comprising a battery powered machine, the first equipment battery voltage threshold value is 22.2 volts and the second equipment battery voltage threshold value is 20 volts.

12. The method of claim 8 wherein the first interval is once every hour and the second interval is once every 12 hours.

13. The method of claim 8 further comprising transmitting a wireless alert signal (i) when the voltage level of the equipment battery is less than or equal to the first equipment battery threshold value, (ii) when the device battery recharges from the equipment battery, and (iii) when the controller enters a hibernation mode.

14. A non-transitory computer readable storage medium having stored computer executable instructions for reporting data associated with equipment in an inactive state via a telematics device comprising (i) a transceiver configured to transmit wireless telematics signals comprising data associated with the equipment, wherein the equipment includes an equipment battery having first and second equipment battery threshold values associated therewith, the first equipment battery threshold value being greater than the second equipment battery threshold value, (ii) a device battery having a device battery threshold value associated therewith, and (iii) a controller, wherein the instructions when executed by the controller cause the telematics device to:

when a voltage level of the equipment battery is greater than a first equipment battery threshold value, transmit equipment telematics signals at a first interval wherein the transceiver is powered by the equipment battery;

when the voltage level of the equipment battery is less than or equal to the first equipment battery threshold value but greater than the second equipment battery threshold value and a voltage level of the device battery is greater than the device battery threshold value, transmit equipment telematics signals at a second interval less frequent than the first interval wherein the transceiver is powered by the device battery;

when the voltage level of the equipment battery is less than or equal to the first equipment battery threshold value but greater than the second equipment battery threshold value and the voltage level of the device battery is less than or equal to the device battery threshold value, transmit equipment telematics signals at a third interval less frequent than the first interval wherein the transceiver is powered by the equipment battery, and recharge the device battery from the equipment battery.

15. The non-transitory computer readable storage medium of claim 14 wherein the third interval is equal to the second interval.

16. The non-transitory computer readable storage medium of claim 14 wherein the instructions when executed by the controller further cause the telematics device to, when the voltage level of the equipment battery is less than or equal to the second equipment battery threshold value and the voltage level of the device battery is less than or equal to the device battery threshold value, enter a hibernation mode.

17. The non-transitory computer readable storage medium of claim 14 wherein the instructions when executed by the controller further cause the telematics device to, when the voltage level of the equipment battery is less than or equal to the second equipment battery threshold value and the voltage level of the device battery is greater than the device battery threshold value, transmit equipment telematics signals at the second interval wherein the transceiver is powered by the device battery.

18. The non-transitory computer readable storage medium of claim 14 wherein, for equipment comprising an internal combustion engine powered machine, the first equipment battery voltage threshold value is 11.1 volts and the second equipment battery voltage threshold value is 10 volts, and wherein, for equipment comprising a battery powered machine, the first equipment battery voltage threshold value is 22.2 volts and the second equipment battery voltage threshold value is 20 volts.

19. The non-transitory computer readable storage medium of claim 14 wherein the first interval is once every hour and the second interval is once every 12 hours.

20. The non-transitory computer readable storage medium of claim 14 wherein the instructions when executed by the controller further cause the telematics device to transmit a wireless alert signal (i) when the voltage level of the equipment battery is less than or equal to the first equipment battery threshold value, (ii) when the device battery recharges from the equipment battery, and (iii) when the controller enters a hibernation mode.

* * * * *